United States Patent
Bakx et al.

[19]
[11] Patent Number: 6,137,755
[45] Date of Patent: Oct. 24, 2000

[54] DERIVING A TRACKING ERROR SIGNAL FROM A TIME DIFFERENCE BETWEEN DETECTOR SIGNALS

[75] Inventors: Johannus L. Bakx; Anthonius L. J. Dekker, both of Eindhoven, Netherlands

[73] Assignee: U.S. Philips Corporation, New York, N.Y.

[21] Appl. No.: 09/062,943

[22] Filed: Apr. 20, 1998

[30] Foreign Application Priority Data

Apr. 25, 1997 [EP] European Pat. Off. .............. 97201244

[51] Int. Cl.[7] ....................................................... G11B 7/00
[52] U.S. Cl. ..................................... 369/44.34; 369/44.25
[58] Field of Search ............................. 369/44.25, 44.29, 369/44.32, 44.34, 44.35, 47, 48

[56] References Cited

U.S. PATENT DOCUMENTS

| | | | |
|---|---|---|---|
| 4,057,833 | 11/1977 | Braat | 358/128 |
| 4,813,031 | 3/1989 | Bierhoff | 369/44.34 |
| 5,150,345 | 9/1992 | Shikichi et al. | 369/44.34 X |
| 5,157,645 | 10/1992 | Takahara et al. | 369/44.34 X |
| 5,181,195 | 1/1993 | Kume et al. | 369/44.34 X |
| 5,610,887 | 3/1997 | Arai et al. | 369/44.34 X |
| 5,787,059 | 7/1998 | Sohmuta | 369/44.34 X |

FOREIGN PATENT DOCUMENTS

| | | | |
|---|---|---|---|
| 0343952A2 | 11/1989 | European Pat. Off. | G11B 7/09 |
| 0458319A | 11/1991 | European Pat. Off. | G11B 7/09 |

*Primary Examiner*—Paul W. Huber
*Attorney, Agent, or Firm*—Michael E. Belk

[57] ABSTRACT

An apparatus for scanning an optically readable record carrier 1, in which a light beam modulated by the information marks in a track on the record carrier is incident on a detection unit with four detectors. A reliable tracking error signal based on time differences between detector signals, is obtained for high-density recording by comparing digitized signals of the detectors with a delayed signal Td generated by a delay unit and based on the digitized signals. The time differences between the detector signals result in length differences between pulses in the comparing signals A and B, which pulses have a nominal length of Td. The comparing signals A and B are low-pass filtered and combined to generate the tracking error signal TE.

8 Claims, 4 Drawing Sheets

DERIVING A TRACKING ERROR SIGNAL FROM A TIME DIFFERENCE BETWEEN DETECTOR SIGNALS

The invention relates to an apparatus for scanning a record carrier having a track comprising optically readable marks representing information, which apparatus comprises means for scanning the record carrier via a radiation beam and tracking means for controlling the position of the radiation beam in a direction transverse to the track direction on the basis of a tracking error signal, the tracking means comprising a detection unit including a multitude of detectors for receiving the radiation beam via the record carrier and an electronic circuit for generating the tracking error signal in dependence on time differences between a first signal and a second signal, the first and second signals being derived from output signals of the detectors.

The invention further relates to a detection unit for use in such apparatus.

Such an apparatus and detection unit are known from U.S. Pat. No. 4,057,833. The apparatus generates the tracking error signal by manipulating the high-frequency signals of the detectors and low-pass filtering the resulting signal. The detector signals are combined and thereafter compared in the analog domain to generate the tracking error signal in dependence on the phase or time difference between said combined signals. A problem of the apparatus is that the value of the tracking error signal is less reliable for short marks representing the information in high-density recording.

It is an object of the invention to provide means for scanning a record carrier which generate a tracking error signal which is more reliable.

For this purpose, an apparatus and detection unit as described in the opening paragraph are characterized according to the invention in that the detection unit comprises digitizing means for digitizing the first and second signal, delaying means for generating a delayed signal based on the first and/or second digitized signal and comparing means for comparing the delayed signal and the first and/or second digitized signals for generating the tracking error signal.

The invention is also based on the following recognition. For the short marks in high-density recording, the time difference which needs to be detected may become small, e.g. in the order of a few ns. If the first and second signals are compared directly to generate a signal representing the time difference, very short pulses will be generated. To handle such short pulses, fast circuits and circuits designed for very high frequency signals are needed, while the circuits may be operating outside their specified operating range. Short pulses may even lead to unstable behaviour of logic circuitry. Operating characteristics in such circumstances will be prone to relatively large production tolerances and may be highly temperature-dependent. This may lead to an offset in the control signal and consequently, an offset in the position of the radiation beam, which will lead to a degraded information signal and errors in the recovered information in the apparatus. According to the invention, a delayed signal is generated and compared with the first and second signals, resulting in pulses with a nominal length of the delay time and a deviation of the nominal length in dependence on the time difference to be detected. This is advantageous in that the pulses can be dealt with reliably with relatively slow electronic circuits within their stable operating range.

In a preferred embodiment of the apparatus according to the invention, the digitizing means comprise slicer means and AC coupling means for coupling the respective first or second signal to the slicer means for slicing the signal relative to a slicing level. This has the advantage that a slicing level can be easily derived from the signal, which slicing level nevertheless proved to be suitable also in adverse scanning conditions.

Further advantageous, preferred embodiments of the apparatus and detection unit according to the invention are given in the dependent claims.

The invention will now be described by way of example and with reference to the accompanying drawings, in which FIG. 1 shows an apparatus for scanning a record carrier, FIG. 2 shows the optical system and detection unit of the apparatus of FIG. 1.

Figure 1:
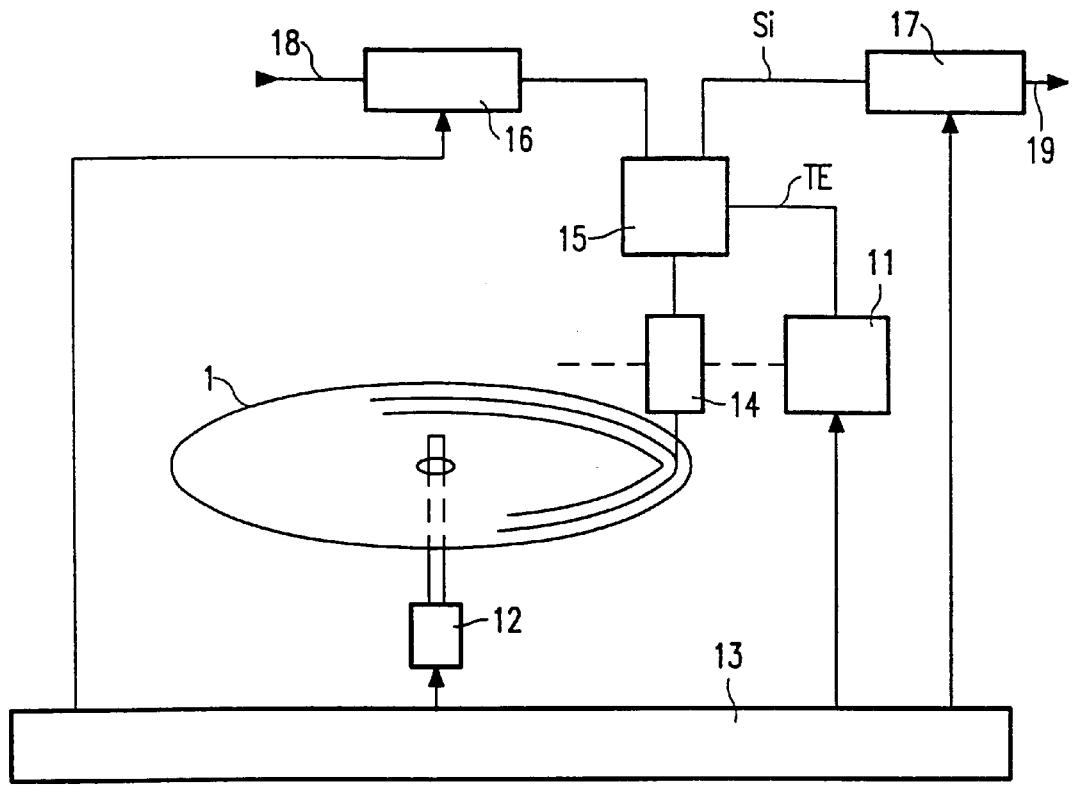
Figure 2:
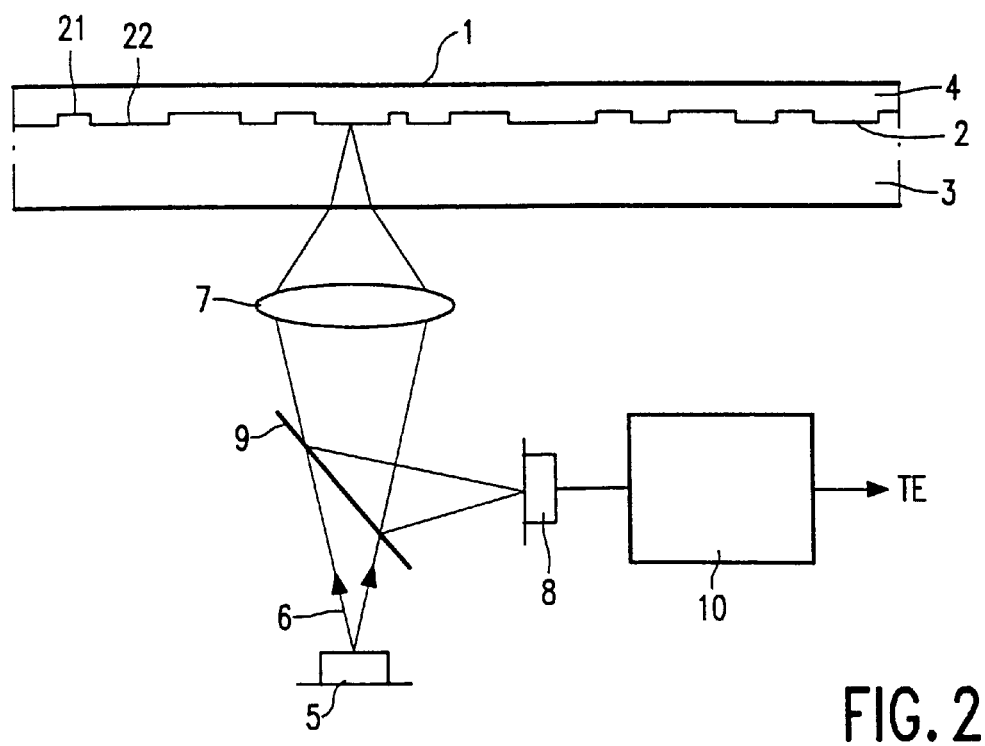

FIG. 1 shows an apparatus according to the invention for scanning a record carrier 1. The apparatus comprises a scanning head 14 for generating a radiation beam and passing the beam via the track on the record carrier to a detector 8 as shown in FIG. 2. The signal output of the scanning head is coupled to a detection circuit 15 for generating a tracking error signal TE. The tracking error signal TE is coupled to a servo circuit 11, which controls the position of the focal point of the radiation beam in a direction transverse to the tracks in response to the Tracking error signal TE. In FIG. 2, tracking is realized by moving the objective system 7, while focus control is realized via a further servo circuit by moving objective system 7 in the direction of its optical axis in response to a focus error signal (not shown). The apparatus comprises a driving unit 12 for moving the record carrier relative to the focal point in a track direction, such as a motor for rotating a disc-shaped record carrier 1 or a tape-transport system for moving an optical tape. Further commonly known electronic circuits included in the detection circuit 15 are coupled to the detector for deriving an information signal $S_i$ representing information read from the record carrier. The information signal is coupled to a decoder unit 17 for retrieving the information, which information is presented at the output 19. A further embodiment of the apparatus may include an encoder unit 16 for encoding information presented at the input 18. The encoded signal is coupled to the scanning head 14 for writing information on the record carrier. The apparatus comprises controller 13 for controlling the scanning operation, which controller is coupled to the driving unit 12, the servo circuit 11 and the encoder 16 and decoder 17. The controller 13 receives commands from the user to read or write information on the record carrier and controls the driving unit 12 in combination with the servo circuit 11 so as to move the scanning head 14 to the part of the track to be scanned.

FIG. 2 shows the optical system and detection unit of the apparatus of FIG. 1. The record carrier comprises an information layer 2 having an optically readable track comprising optically readable marks 21,22 representing information. A mark may assume any form, provided it optically contrasts with its surroundings. It may be a pit or a bump, as shown in the Figure, or a region with a different, possibly complex, refractive index, such as a region formed by the so-called phase-change rewritable materials. Marks may represent information by their length, being indicative of a number of bit cells having a predefined logical level and said bit cells being coded by an appropriate channel code, e.g. the EFM modulation of the CD. The information layer is arranged on a transparent substrate 3, through which the information layer is scanned. The other side of the information layer is covered with a protective layer 4. The record carrier may comprise more than one information layer, arranged one above the other, or may be a combination of two stacks of layers for double-sided reading. The optical system comprises a radiation source 5, emitting a radiation beam 6. The radiation beam is focused on information layer 2 by an objective system 7, shown as a single lens in FIG. 2. Radiation reflected by the information layer is directed via a beam splitter 9 towards a detector 8. The beam splitter may be a semi-transparent plate or a diffraction grating, and may be polarization-dependent. The detector 8 converts the incident radiation into one or more electrical signals, which are fed into an electronic circuit 10 to derive tracking control signals. One of the control signals is a tracking error signal TE, representing the distance between the centre of the spot formed by the radiation beam on the information plane and the centre line of the track being scanned. Another control signal is a focus error signal FE (not shown), representing the distance between the focal point of the radiation beam and the information plane.

Figure 3:
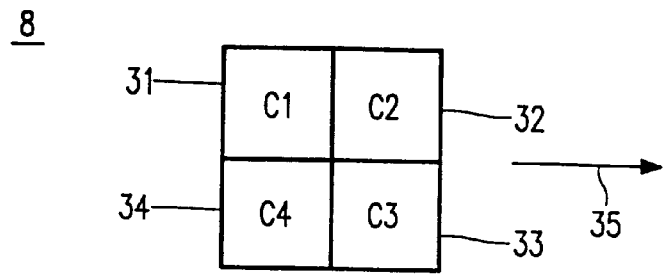
FIG. 3 shows a multitude of detectors

FIG. 3 shows the radiation-sensitive detector 8 comprising four detectors 31, 32, 33 and 34, arranged in four separate quadrants of an imaginary X-Y coordinate system, of which the Y-axis substantially extends effectively in the track direction as indicated by the arrow 35 and the X-axis substantially extends effectively transversely to the track direction. An axis is said to extend effectively in the track direction if, looking from the detection system through the intermediate optics to the information plane comprising the track, the direction of the axis coincides with the direction of the track. A deviation of the scanning spot transversely to the track direction is said to have an x<>0.

The optical axis of objective system 7 passes through the origin of the coordinate system when the objective system and the detection system are in their nominal positions. The spot of the beam reflected from the record carrier is then also centred on the quadrant. The detection system is preferably arranged in the far field of the information layer. It is also possible to arrange the detection system in the plane of the circle of least confusion of an astigmatic beam reflected from the information plane. A further description of the optical system and an X-Y coordinate system for a multiple detector can be found in U.S. Pat. No. 4,057,833, which has already been mentioned in the introduction.

The part of electronic circuit 10 shown in FIG. 2 is coupled to the four output signals of detectors 31 to 34, indicated by C1, C2, C3 and C4 and forms a radial tracking control signal as described below. The method of deriving track error signals from time differences between the signals of the detectors when marks in the track are scanned is generally called DTD (Differential Time Detection). A first method, DTD2, uses diagonally summed signals: D1=C1+C3 and D2=C2+C4, while a second method, DTD4, uses each signal:

$$DTD2: \ TE = \frac{1}{T}\tau(D1, D2)$$

$$DTD4: \ TE = \frac{1}{T}[\tau(C2, C3) + \tau(C4, C1)]$$

where T is the channel clock time, i.e. the time corresponding to a bit cell, and $\tau(x,y)$ is the averaged time delay between crossings of signals x and y with a suitable slicing level, when the radiation beam passes the edges of the marks. The averaging may be carried out by means of a low-pass filter, which is necessary in view of a substantial variation in delay from edge to edge.

Figure 4:
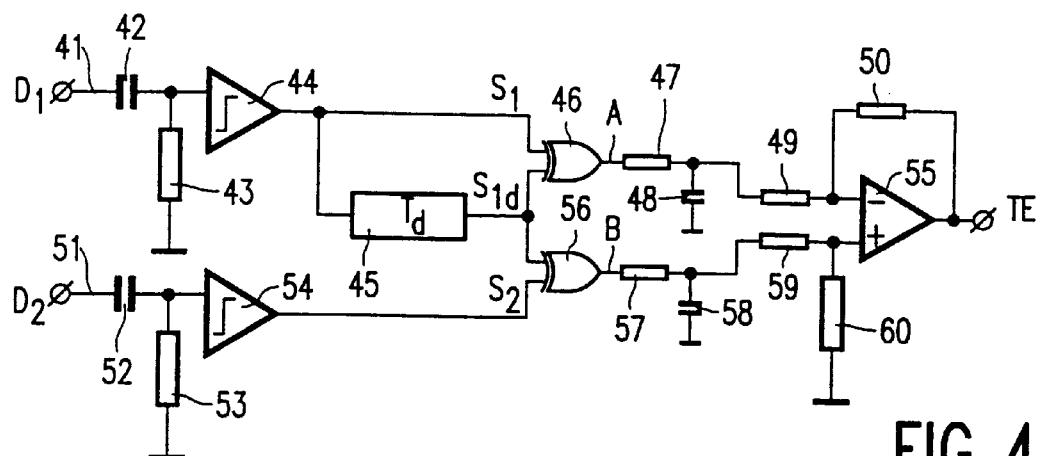
FIG. 4 shows a detection circuit

FIG. 4 shows a detection circuit according to the invention. An input 41 receives the summed signal D1 which is coupled via a capacitor 42 to the input of a slicer 44. The input of the slicer 44 is coupled via a resistor 43 to a suitable level, i.c. ground level, for forming a suitable slicing level. The output S1 of the slicer 44 is coupled to a first input of a logical comparator (EXOR) 46, whose output A is coupled to a low-pass filter comprising a series resistor 47 and a parallel capacitor 48. The output of the low-pass filter is coupled to a first difference input of a difference amplifier, and via a first resistor 49 to the negative input of an amplifier 55, whose output delivers the tracking error signal TE, and is fed back to the negative input via a second resistor 50. The second summed signal D2 at input 51 is coupled to the second differential input of the difference amplifier via corresponding elements, i.e. a slicer 52,53,54, comparator 56 having output B and low-pass filter 57,58. The second difference input is coupled via a third resistor 59 to the positive input of amplifier 55, which is coupled to ground level via a fourth resistor 60. The ratio between the first resistor 49 and the second resistor 50 should be equal to the ratio between the third resistor 59 and the fourth resistor 60 to eliminate the common mode voltage of the filtered difference signals. According to the invention there is one delay unit 45 coupled to the output S1 to obtain delayed signal S1d, which delayed signal is coupled to the second inputs of the logical comparators 46, 56. The delay unit may be implemented by inverters and/or buffers connected serially. In an alternative embodiment the input of delay unit 45 is coupled to the output S2, resulting in a same, yet inverted, tracking error signal TE. The operation of the circuit is described below with reference to FIG. 5.

Figure 5A:
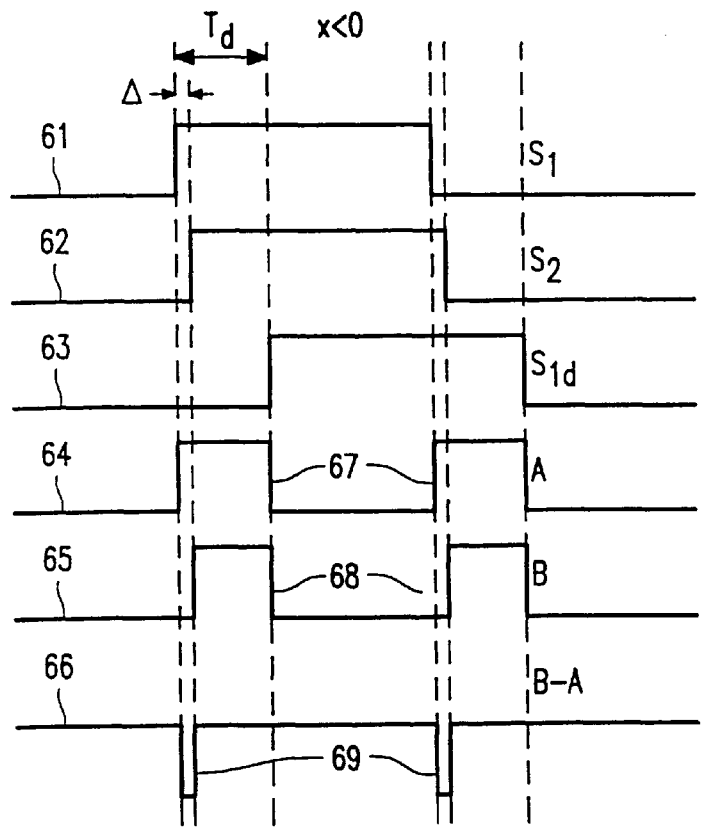
FIGS. 5A and 5B show time difference signals
Figure 5B:
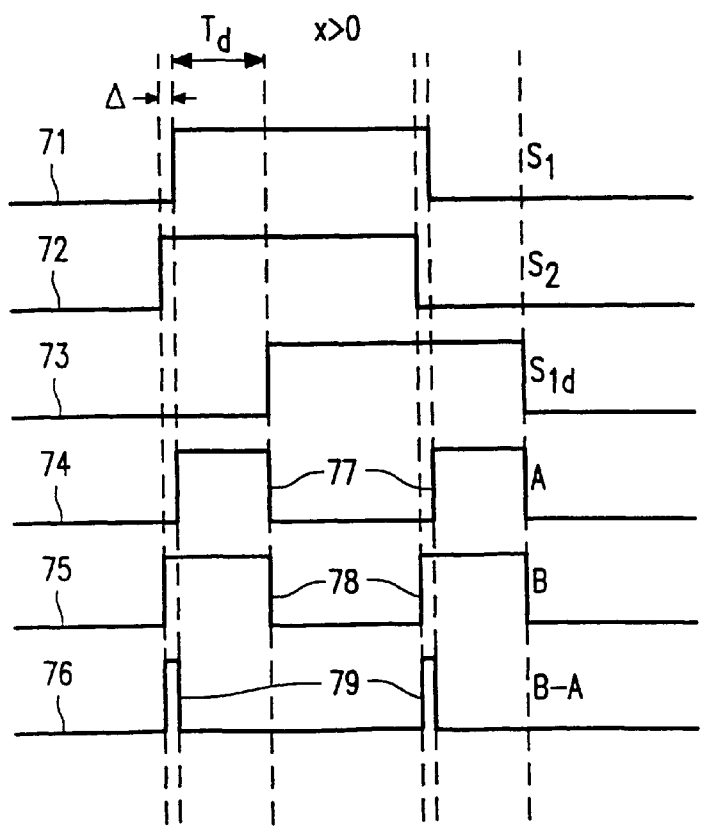

FIG. 5 diagrammatically shows the time difference signals occurring in the circuit of FIG. 4 during operation, when the beam passes a mark. Two possible situations are shown, FIG. 5A shows the signals in the event that there is a negative deviation of the centre of the track, x<0 in the X-Y plane (described with reference to FIG. 3). FIG. 5B shows the signals in the event that x>0. The first signals 61,71 give the output S1 of the first slicer 44, while the second signals 62,72 give the output S2 of the second slicer, which is a small period of time Δ later than the first signals. This small difference in time Δ at the edges of the mark is indicated by broken vertical lines. The third signals 63,73 give the output S1d of the delay unit 45, the delay time is indicated by Td. The fourth signals 64,74 give the output signal A of the first comparator 46, A=S1⊕S1d, while the fifth signals 65,75 give the output signal B of the second comparator 56, B=S2⊕S1d (⊕ indicating the EXOR function). It can be seen that the pulses 67 of signal A have a length Td, which is equal to the delay time of delay unit 45 and the relevant propagation delays in the comparator. The pulses 68 of the signal B have a length Td−Δ. In the event that x>0, the second signals arrive before the first and the pulses 77 in signal A still have the nominal length Td, while the pulses 78 in signal B are longer now with a length Td+Δ. The difference is indicated in the sixth line 66 as negative going pulses 69, while in the opposite case, positive going pulses 79 are drawn in line 76. It has to be noted that the short pulses 69,79 need not be formed in the circuit, but represent the difference between the signals A and B. By contrast, the inventors have realized the relatively long pulses in the signals A and B, which can be handled by standard logic components, while the difference Δ may be only a few ns. Signals A and B are low-pass filtered and the difference is determined and amplified by the difference amplifier. The common mode signals present in A and B are exactly equal because these common mode signals are govered by the only delay time of delay unit 45. A further embodiment of the apparatus comprises seperate delay units for a multitude of detector signals which create a multitude of delayed signals. This may be advantageous in IC designs for separating the various HF signals in separate parts of the circuit. A further embodiment may have additional subdetectors for forming further combined detector signals, while time differences between said combined detector signals can be detected by the detection unit comprising the delay unit(s) described above. Although the circuit of FIG. 4 is especially suitable for generating a tracking error signal as described above, a time difference signal may be desired in other applications, which incorporates a number of signals having signal elements which may be shifted in time over short distances. The circuit of FIG. 4 (and the further embodiments) may serve as a difference detection unit for generating a difference signal in dependence on time differences between a first signal and a second signal.

Figure 6:
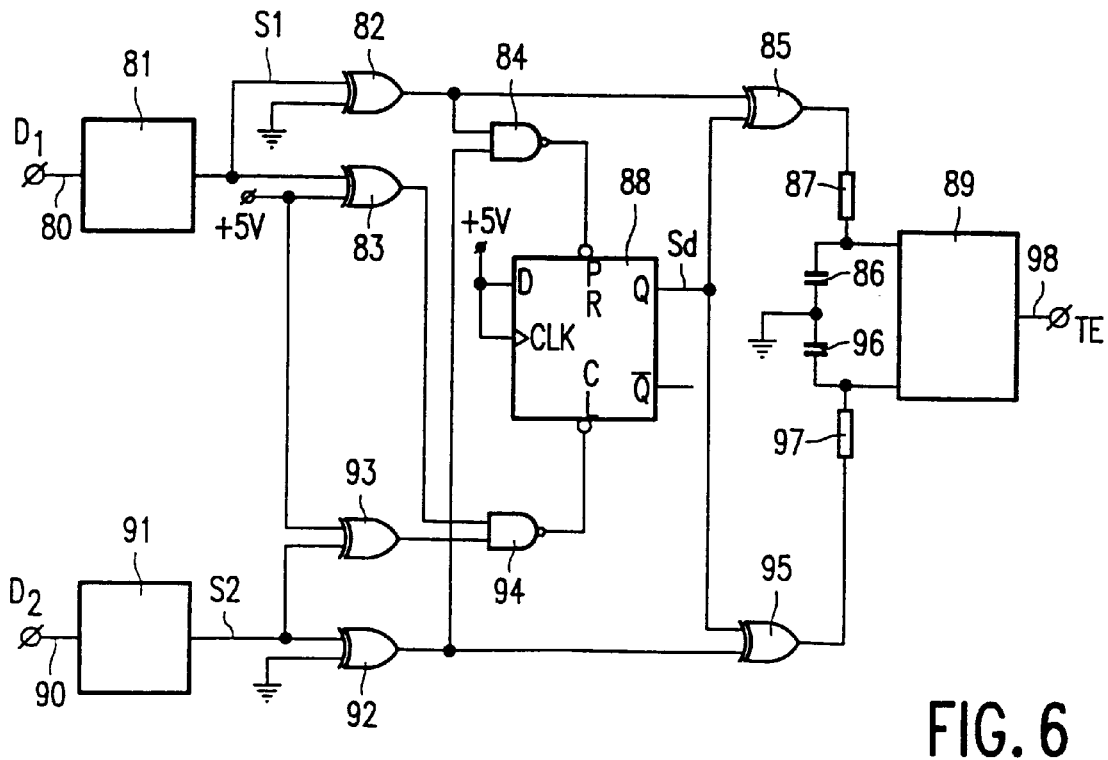
FIG. 6 shows a second embodiment of a detection circuit

FIG. 6 shows a second embodiment of a detection circuit according to the invention. A first input 80 receives summed signal D1, which is digitized to signal S1 by digitizing means 81, for example the above-described slicer means 42,43,44. The digitized summed signal S1 is coupled to a first buffer 82 and a first inverter 83, and implemented by EXOR circuits to create a logical circuit with equal delays. The output of first buffer 82 is coupled to a first input of the first NAND gate 84 and to a first comparator 85. The output of the first inverter 83 is coupled to a first input of a second NAND gate 94. A second input 90 receives summed signal D2, which is digitized to signal S2 by digitizing means 91. The digitized summed signal S2 is coupled to second buffer 92 and second inverter 93, and implemented by EXOR circuits to create a logical circuit with equal delays. The output of second buffer 92 is coupled to a second input of the first NAND gate 84 and to a second comparator 95. The output of the second inverter 93 is coupled to a second input of the second NAND gate 94. The output of the first NAND gate 84 is coupled to the Preset input (PR, active low) of a flip-flop 88 of the usual D type, of which the D input and clock input CLK are connected to a suitable positive voltage, e.g. a supply rail of +5V (as shown) or 3.3V etc. The output of the second NAND gate 94 is coupled to the Clear input (CL, active low) of the flip-flop 88, while the Q output of the flip-flop 88 generates the delayed signal Sd. Like the embodiment described with reference to FIG. 4, the outputs of the comparators 85,95 are coupled via low-pass filters to a difference amplifier 89 for generating the tracking error signal TE at output 98, while the low-pass filters comprise series resistors 87,97 and parallel capacitors 86,96. The operation of the embodiment shown in FIG. 6 is as follows. The delay unit is formed by the propagation delays of the NAND gates 84,94 and the flip-flop 88, resulting in a total delay Td. The signal Sd will be weakened if the Reset is active when both S1 and S2 are low, while the signal Sd will be strengthened as soon as both S1 and S2 are high, i.e. when the lagging one of the digitized signals goes up. It will be weakened again when the lagging one, i.e. either S1 or S2, goes down and the delayed signal Sd changes polarity in dependence on the latter of the two digitized signals. Therefore, the comparator receiving the earlier signal will output a prolonged pulse determined by the leading edge of the earlier signal and the trailing edge of the delayed signal Sd, while the other comparator outputs a pulse of a nominal duration Td. When the other signal is lagging, the outputs will be exchanged. This has the advantage that, as only nominal or prolonged pulses are formed at the comparator outputs, the selection of Td is less critical than in an embodiment where also shorter pulses are formed as in the embodiment of FIG. 4. Also when large time differences occur, i.e. in low-density recording, the prolonged pulses will still be correctly formed.

In an embodiment of the apparatus, the digitizing means comprise slicer means AC coupled to the respective first or second signal for slicing the signal relative to a slicing level $L_{ac}$. An implementation is shown in FIG. 4, in which resistor 43,53 coupled to ground determines the slicing level $L_{ac}$ in combination with the capacitor 42,52, which establishes the AC coupling. However, the slicing level $L_{ac}$ is significantly different from the usual slicing level $L_f$ which is generated for recovering the data. $L_{ac}$ is generated such that before slicing the area of the signal above $L_{ac}$ equals the area below $L_{ac}$, while $L_f$ is generated such that after slicing the area of the signal above $L_f$ equals the area below $L_f$. In the event of an asymmetrical HF input signal, the signal $L_{ac}$ shows an error which would be unacceptable for data recovery. However, the inventors have surprisingly found that for generating the tracking error signal, the error is quite acceptable. This has the advantage that the AC coupled slicer does not require feedback after slicing and that the circuit can be produced more easily and more rapidly obtains an acceptable slicing level in adverse optical scanning circumstances.

Figure 7:
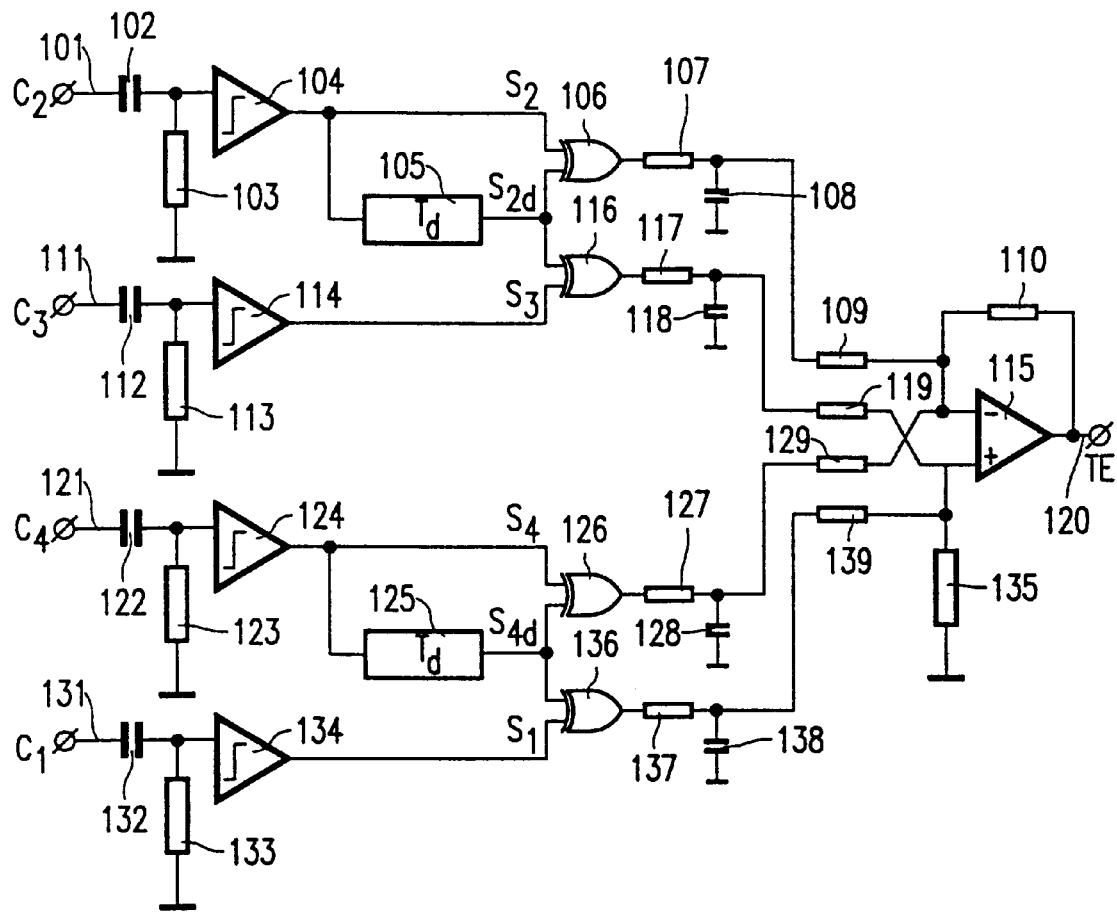
FIG. 7 shows a detection circuit for DTD4

FIG. 7 shows a detection circuit for DTD4 for an apparatus according to the invention for processing four detector signals as described above with reference to FIG. 2. The four signals may be the signals C1, C2, C3 and C4 of the four detectors 31,32,33,34 as described with reference to FIG. 3. The circuit shown in FIG. 4 is a duplicate of inputs up to the low-pass filters, the signals C2 and C3 on the inputs 101, 111 being compared in the upper section and the signals C4 and C1 on the inputs 121,131 being compared in the lower section. The four inputs 101,102,103,104 are coupled to four digitizing sections each comprising a capacitor 102,112,122, 132, a resistor 103,113,123,133 and a slicer 104,114,124,134 for generating four digitized signals S2, S3 and S4, S1. An upper delay unit 105 generates a delayed signal S2d based on the digitized signal S2, and a lower delay unit 125 generates a delayed signal S4d based on the digitized signal S4. The delayed signals S2d and S4d are compared with the digitized signals S2 and S3, and S4 and S1, respectively, by four comparators 106,116,126,136, which have outputs coupled to low-pass filters each having a series resistor 107,117,127,137 and a parallel capacitor 108,118,128,138. The four outputs of the low-pass filters are coupled to a single difference amplifier 115; the time difference signals based on S2 and S4 are coupled via difference input resistors 109,129 to the negative input of the difference amplifier 115 and the time difference signal baseds on S3 and S1 are coupled via difference input resistors 119,139 to the positive input of the difference amplifier 115 as indicated in the DTD4 formula. The tracking error signal TE is generated at the output of the difference amplifier 115 and coupled to the negative input via feedback resistor 110. The difference input resistors 109,119,129,139 are much larger than the resistors 107,117,127,137 in the low-pass filters to prevent influencing of the low-pass filtering. The DTD4 circuit has the advantage that a reliable tracking error signal is generated in adverse scanning conditions.

What is claimed is:

1. Apparatus comprising:
    means for scanning a track on a record carrier with a radiation beam; and tracking means for controlling the position of the radiation beam in a direction transverse to a track direction on the basis of a tracking error signal and including:
  a detection unit including a multitude of detectors for receiving different portions of a radiation beam from the record carrier and for producing respective output signals upon receiving the corresponding radiation beam portions;
  electronic circuit means for generating the tracking error signal depending on time differences between a first detector signal and a second detector signal, the first and the second detector signals being derived from the output signals of the detectors, the time differences of the first and second detector signals depending on time difference between receiving respective portions of the radiation beam at the corresponding detectors;
  digitizing means for digitizing the first and second detector signals to provide first and second digitized signals;
  delaying means for generating a delayed signal based on the first and/or second digitized signals; and
  comparing means for comparing the delayed signal with the first and/or second digitized signals for generating the tracking error signal.

2. The apparatus of claim 1, in which the delayed signal is dependent on the digitized signal, either the first or the second digitized signal, that lags the other, and independent of the other digitized signal.

3. The apparatus of claim 1, in which the digitizing means include slicer means and AC coupling means for coupling the respective first or second signal to the slicer means for slicing the signal relative to a slicing level.

4. The apparatus of claim 1, in which the comparing means include:
  means for generating a first comparing signal depending on the difference between the delayed signal and the first digitized signal and a second comparing signal depending on the difference between the delayed signal and the second digitized signal;
  low-pass filtering means for averaging the comparing signals; and
  difference measuring means coupled to the outputs of the low pass filtering means for generating the tracking error signal.

5. The apparatus of claim 1, in which the detection unit includes:
  further digitizing means for digitizing a third and a fourth signal derived from the outputs of the detectors; and
  second delaying means for generating a second delayed signal based on the third and/or fourth digitized signal; and
  in which the comparing means include means for comparing the second delayed signal with the third and/or fourth digitized signals.

6. A detection unit comprising:
  a multitude of detectors for receiving a radiation beam from an information track on a record carrier and producing output signals;
  electronic circuit means for generating a tracking error signal depending on time differences between a first detector signal and a second detector signal, the first and second detector signals being derived from the output signals of the detectors, the time differences of the first and second detector signals depending on time difference between receiving respective portions of the radiation beam at the corresponding detectors;
  digitizing means for digitizing the first and the second detector signal to provide respective first and second digitized signals;
  delaying means for generating a delayed signal based on the first and/or the second digitized signal; and
  comparing means for comparing the delayed signal with the first and/or second digitized signals for generating the tracking error signal.

7. A difference detection unit for generating a difference signal depending on time differences between a first signal and a second signal, comprising:
  digitizing means for digitizing the first and the second signal;
  delaying means for generating a delayed signal based on the first and/or the second digitized signal; and
  comparing means for comparing the delayed signal with the first and/or second digitized signals for generating the difference signal.

8. Apparatus comprising:
  means for scanning a track on a record carrier with a radiation beam; and
  tracking means for controlling the position of the radiation beam in a direction transverse to a track direction on the basis of a tracking error signal, and including:
    a detection unit including a multitude of detectors for receiving different respective portions of a radiation beam from the record carrier and for producing respective output signals upon receiving the corresponding radiation beam portions;
    electronic circuit means for generating the tracking error signal depending on time differences between a first detector signal and a second detector signal, the first and the second detector signals being derived from the output signals of the detectors, the time differences of the first and second detector signals depending on time difference between receiving respective portions of the radiation beam at the corresponding detectors;
    digitizing means for digitizing the first and second detector signals to provide first and second digitized signals;
    delaying means for generating a delayed signal based on the first and/or second digitized signals; and
    deriving a tracking error signal from the difference between the delayed signal and the first and/or second digitized signals.

* * * * *